(No Model.)
M. BLUE.
SASH HOLDER.
No. 412,067. Patented Oct. 1, 1889.
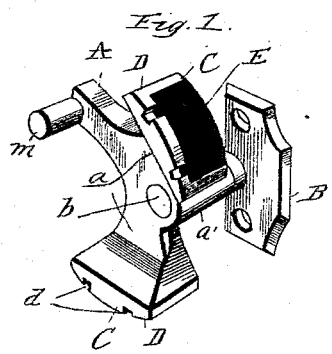
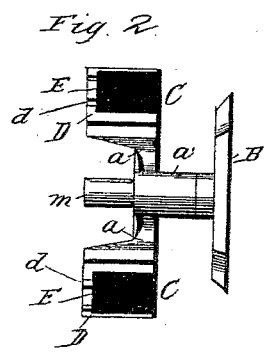
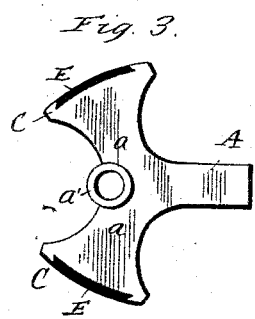
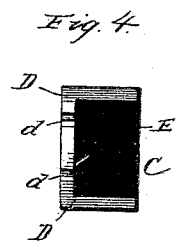
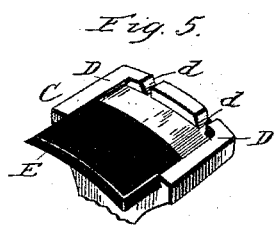
Witnesses,
H. Raeder
Van Buren Hillyard.
Inventor,
Montgomery Blue.
By his Attorneys
R.S. & A.P. Lacey

UNITED STATES PATENT OFFICE.

MONTGOMERY BLUE, OF PORT JEFFERSON, OHIO.

SASH-HOLDER.

SPECIFICATION forming part of Letters Patent No. 412,067, dated October 1, 1889.

Application filed May 10, 1889. Serial No. 310,275. (No model.)

*To all whom it may concern:*

Be it known that I, MONTGOMERY BLUE, a citizen of the United States, residing at Port Jefferson, in the county of Shelby and State of Ohio, have invented certain new and useful Improvements in Sash Locks and Stops Combined; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to window-fasteners which are designed to lock the sash in either an open or closed position, and has for its object to devise means whereby rubber or similar material can be readily affixed to the ends of the fastener and quickly and conveniently removed, when worn, to be replaced by new material.

The improvement consists of the novel features which will be hereinafter more fully described and claimed, and which are shown in the accompanying drawings, in which—

Figure 1 is a perspective view of a fastener embodying my invention. Fig. 2 is a front view of the fastener. Fig. 3 is a view of the inner or reverse side of the lever. Fig. 4 is a front view of the head of the lever. Fig. 5 is a perspective view of the head of the lever, showing the rubber plate partly drawn out.

The lever A is mounted on the arm $b$, that projects from the base B and has lateral arms $a$, which terminate in the heads C. The lever is provided with the hub $a'$ to obtain an extended bearing therefor on the arm $b$, to render the device stable. The heads C extend laterally from the arms and have a rim D, that incloses it on three sides, the fourth side being open to permit the strip E, of rubber or kindred material, being inserted therein laterally. The rim D is undercut on its inner side to overlap the edges of the strip E and hold it in place. That portion of the rim D opposite the open side is provided with notches $d$ $d$ to permit the insertion of a suitable instrument behind the rear edge of the strip to pry it out when required. The handle $m$ at the end of the lever A is designed to be grasped when operating the said lever, as will be readily understood.

Having thus described my invention, what I claim, and desire to secure by Letters Patent, is—

1. The herein-described lever A, having the laterally-projecting head C, and having the undercut rim D extending around the head on three sides, that portion of the rim opposite the open side being notched, and the strip E, inserted sidewise in the space inclosed by the rim and held in place by the overlapping portions of the rim, substantially as described.

2. The herein shown and described fastener, composed of the base B, having the arm $b$, the lever A, having the handle $m$ and hub $a'$ mounted on the arm $b$, and having the radial arms $a$, which extend in opposite directions and terminate in the lateral heads C, that have the undercut rim D, which rim closes the heads C in on three sides, that portion of the rim opposite the open side being notched, and the strip E, fitted in the space inclosed by the rim, substantially as described.

In testimony whereof I affix my signature in presence of two witnesses.

MONTGOMERY BLUE.

Witnesses:
ELMER M. HONNELL,
THOMAS J. HANEY.